United States Patent
Cavalli et al.

(10) Patent No.: US 6,870,006 B2
(45) Date of Patent: Mar. 22, 2005

(54) WATER-SOLUBLE HOTMELT ADHESIVE

(75) Inventors: Dario Cavalli, Milan (IT); Stefano Carrara, Dalmine (IT); Thomas Moller, Duesseldorf (DE)

(73) Assignee: Henkel Kommanditgesellschaft auf Aktien (Henkel KGaA), Duesseldorf (DE)

( * ) Notice: Subject to any disclaimer, the term of this patent is extended or adjusted under 35 U.S.C. 154(b) by 0 days.

(21) Appl. No.: 10/604,739

(22) Filed: Aug. 13, 2003

(65) Prior Publication Data

US 2004/0234739 A1 Nov. 25, 2004

(30) Foreign Application Priority Data

May 19, 2003 (DE) ......................................... 103 22 782

(51) Int. Cl.[7] .............................................. C08G 18/62
(52) U.S. Cl. .................... 525/123; 156/155; 156/331.7; 428/425.1
(58) Field of Search .......................... 525/123; 156/155, 156/331.7; 428/425.1

(56) References Cited

U.S. PATENT DOCUMENTS

| 4,129,539 A | 12/1978 | Fakla et al. |
| 5,821,294 A | 10/1998 | Perlinski |

FOREIGN PATENT DOCUMENTS

| WO | WO 99/59808 | 11/1999 |

*Primary Examiner*—Rachel Gorr
(74) *Attorney, Agent, or Firm*—Brooks Kushman P.C.

(57) ABSTRACT

The present invention pertains to a water-soluble hotmelt adhesive, containing: 40 to 70% by weight of at least one homopolymer or copolymer with free carboxylic acid groups based on ethylenically unsaturated monomers (component A), 15 to 45% by weight of at least one water-soluble or water-dispersible polyurethane (component B), 10 to 45% by weight of at least one inorganic or organic base (component C), and 0 to 20% by weight of further additives (component D), wherein the sum of such components is 100% by weight. The water-soluble hotmelt adhesive is suitable for producing textile laminates, moisture-tackifiable papers and at least two-ply hygiene-papers, in particular tissue.

28 Claims, No Drawings

WATER-SOLUBLE HOTMELT ADHESIVE

BACKGROUND OF INVENTION

1. Field of the Invention

This invention relates to a water-soluble hotmelt adhesive, to a process for producing it and to its use in the textile, packaging and paper industry. The invention also relates to at least two-ply paper laminates and moisture-tackifiable papers and textile laminates which contain the water-soluble hotmelt adhesive according to the invention as well as to processes for producing these two-ply laminates, moisture-tackifiable papers and textile laminates.

2. Discussion of the Related Art

Hotmelt adhesives are adhesives which are solid at room temperature and at least substantially water- and solvent-free, e.g., the amount of water/solvent is less than 5% by weight. Hotmelt adhesives are applied from the melt to the substrates to be bonded and set due to solidification on cooling.

Base polymers substantially determine the properties important for the hotmelt adhesives such as adhesion, tenacity and temperature behaviour.

The following polymers are conventionally used as base polymers in hotmelt adhesives: thermoplastic polymers such as block copolymers, e.g., styrene-butadiene, styrene-butadiene-styrene, styrene-isoprene-styrene, styrene-ethylene butylenes-styrene, styrene-ethylene propylene-styrene; ethylene vinyl acetate polymers, other ethylene esters and copolymers, e.g., ethylene with acrylate, ethylene n-butyl acrylate and ethylene acrylic acid; polyolefins such as polyethylene and polypropylene, e.g., amorphous propylene α-olefins (APAO); polyvinylacetate (PVAc) and PVAc copolymers, polyacrylates, polyamides, polyesters, polyvinylalcohols (PVA) and PVA copolymers, polyurethanes, polystyrenes, polyepoxides, copolymers of vinyl monomers and polyalkylene oxide polymers, aldehydes, which contain resins such as phenol aldehyde, urea aldehyde, melamine aldehyde and the like.

Pressure-sensitive as well as non-blocking adhesive systems that can be granulated are commercially available.

Hotmelt adhesives are widely used in the packaging and paper industry for sealing and closing cartons, as moisture-tackifiable adhesives on stamps and envelopes or for producing at least two-ply paper laminates for use as hygiene paper. These hotmelt adhesives have to fulfill many requirements in that branch of industry: The hotmelt adhesives therefore have to have a middle to long open time (defined as the time interval between adhesive application and the fixing of parts to be bonded), but after the fixation of the parts to be bonded they need to set fast enough to guarantee a high-quality bond, in particular on fast-running packaging, paper processing or labelling machines. Beside the speed of setting, viscosity is another important criterion for the selection of the hotmelt adhesive. For mechanical processing, especially for uniform hotmelt adhesive application, the viscosity has to be sufficiently low at the respective application temperature. For bonding of packagings in the frozen-food area where packaged goods are stored at temperatures down to −35° C. low temperature flexibility must be provided. That means that at low temperatures, high tenacity of the adhesive bonding has to exist and the adhesive should not get brittle or break. On the other hand, warm or hot ready-prepared food or beverages are often packaged, in which case appropriately high stability of the adhesive is required. Sufficiently high stability means that the adhesive does not soften or flow under the influence of elevated temperature and therefore cause detachment and/or cause the bonded parts to shift against each other. Furthermore, especially for the food industry, substantially odor-free or low-odor hotmelt adhesives are required. Components which are used in corresponding hotmelt adhesives have to be licensed for use in the food industry. In addition it has to be remembered that very different substrates are bonded to each other, such as paper, cardboard, cartons coated with polyolefins and many more. Sufficient adhesion of the hotmelt adhesive to all these different substrates must be present.

Another requirement for hotmelt adhesives, especially those used for bonding hygiene papers, is that they should be as soluble as possible in water. This requirement is due to the large amounts of recycled paper used in the production of hygiene papers, i.e. production waste must be able to be directly reused in the production of new paper layers. To this end, however, the adhesive between the individual layers has to be completely removed from a recycled fibre slurry. Water-insoluble or substantially water-insoluble adhesive constituents, which can pass into the paper web from the recycled fibrous material during the production of a new paper layer, can lead to serious production downtimes. These adhesive residues normally form what are known as "sticky spots" in the recycled paper webs, i.e. tacky spots which cause the paper web to stick on rollers and similar guide elements for the paper web. This normally results in tearing of the paper webs and prolonged interruptions in production. Accordingly, not only must the bond itself be reversible by water, leading to a dispersion of the adhesive in water, but the adhesive itself must be completely soluble in water. This prevents any discharged adhesive residues from leading to tacky agglomerates.

Water-dispersible hotmelt adhesives are known. U.S. Pat. No. 4,129,539 discloses a hotmelt adhesive, which is dispersible in cold water and based on a copolymer of vinyl acetate and crotonic acid, a colophonium ester of dipentaerythritol and an aliphatic amino alcohol. A disadvantage of the disclosed adhesive system is that it does not form a clear aqueous solution. In addition, the adhesive strength is often insufficient for bonding paper laminates.

A process for producing at least two-ply paper laminates or moisture-tackifying materials is known from WO 99/59808, in which a water-soluble hotmelt adhesive based on a polyalkylene glycol with a molecular weight ($M_n$) of 1,000 to 100,000 or a nonionic polyurethane with a molecular weight ($M_n$) of at least 2,000 or a polyester with a molecular weight of at least 3,000 is disclosed. The bonding strength of these compositions is often also insufficient.

Accordingly, an object of the present invention was to provide a hotmelt adhesive for the packaging and paper industry which can be applied as a melt, establishes a strong, permanent and rapid bond, even in the smallest quantities (less than 0.3 g/m$^2$), after assembly of paper and, in addition, is completely soluble in water, i.e., miscible with water in any quantity. The hotmelt adhesive must also be suitable for fast-running manufacturing processes on packaging and labelling machines and in hygiene paper production and processing.

To produce textile laminates, textile fabrics, leather or synthetic leather are sewed together. Conventional sewing techniques include tufting, crocheting or knitting.

The congruent sewing of cut textile pieces is a problem here. Depending on the type and size of material and the manufacturing conditions selected, the superimposed cut textile pieces can slip, and this leads to production waste. The industry is looking for economical solutions for the congruent fixing of the cut textile pieces prior to sewing, without adversely affecting the material properties of the sewn textile laminate.

Starting from this prior art, a further object was to prepare a hotmelt adhesive for the production of textile laminates.

SUMMARY OF INVENTION

The present invention provides a water-soluble hotmelt adhesive, comprising: from 40 to 70% by weight, preferably 45 to 65% by weight, of at least one homopolymer or copolymer with free carboxylic acid groups based on ethylenically unsaturated monomers (component A); from 15 to 45% by weight, preferably 20 to 40% by weight, of at least one water-soluble or water-dispersible polyurethane (component B); from 10 to 45% by weight, preferably 12 to 35% by weight, of at least one inorganic or organic base (component C); and 0 to 20% by weight of further additives, the sum of the components being 100% by weight.

DETAILED DESCRIPTION

As required, detailed embodiments of the present invention are disclosed herein. However, it is to be understood that the disclosed embodiments are merely exemplary of the invention that may be embodied in various and alternative forms. Therefore, specific details disclosed herein are not to be interpreted as limiting, but merely as a representative basis for the claims and/or as a representative basis for teaching one skilled in the art to variously employ the present invention.

The hotmelt adhesive according to the invention is water-soluble, i.e., an amount of 3 g of the hotmelt adhesive dissolves completely in 600 g water at a pH of from 5 to 8 and at a temperature of 40° C.

By "complete dissolution" is meant that no tacky dispersedly distributed particles are formed in water. Preferably a molecularly dispersed solution of the adhesive is formed.

The homopolymers or copolymers to be used in the context of the invention with free carboxylic acid groups based on ethylenically unsaturated monomers (component A) may be obtained by homo- or copolymerization of ethylenically unsaturated monomers or oligomers containing at least one carboxyl group per molecule, of the type used, for example, for the synthesis of base polymers. Polymers obtained by copolymerisation of ethylenically unsaturated monomers or oligomers, which have no carboxyl group in the molecule, with ethylenically unsaturated aliphatic comonomers which contain at least one, carboxyl group per molecule are preferred as component A. Copolymers useful in the present invention may contain two or more different types of monomers. Mixtures of different polymers and/or copolymers may be utilized as component A.

In particular, vinyl acetate is preferred as an ethylenically unsaturated monomer containing no carboxyl group.

Examples of copolymerizable ethylenically unsaturated aliphatic comonomers with at least one carboxyl group are C3 to C6 mono- and di-carboxylic acids such as acrylic acid, methacrylic acid, crotonic acid, isocrotonic acid, tiglic acid, senecioic acid, alpha-pentenic acid, maleic acid, fumaric acid, citraconic acid, mesaconic acid, itaconic acid and aconitic acid.

Further monomers can be used in the copolymerization reaction. Examples of further comonomers are ethylene, propylene, butylene, 1-hexene, as well as anhydrides or esters of the above-mentioned ethylenically unsaturated monomers with at least one carboxyl group per molecule.

The copolymer (component A) preferably has an acid value of 10 to 200, more preferably 20 to 150, mg KOH/g (measured according to ASTM D 974).

The water-soluble hotmelt adhesive according to the invention contains 40 to 70% by weight, preferably 44 to 65% by weight and particularly preferably 50 to 60% by weight of component A.

In a particularly preferred embodiment of the invention the water-soluble hotmelt adhesive contains as component A a vinyl acetate/crotonic acid copolymer with an acid value of 10 to 200 mg KOH/g, preferably 20 to 150 mg KOH/g and particularly preferably 25 to 100 mg KOH/g (measured according to ASTM D 974). The softening point of the vinyl acetate/crotonic acid copolymer is in the range of 80 to 130° C., preferably 90 to 120° C. (ring and ball method, DIN 52011). The molecular weight ($M_n$) is in the range from 10,000 to 60,000, preferably 20,000 to 50,000.

Molecular weights based on polymeric compounds refer (unless otherwise stated) to the number average of the molecular weight ($M_n$). All molecular weights refer (unless otherwise stated) to values obtainable by gel permeation chromatography (GPC).

Commercially available vinyl acetate/crotonic acid copolymers are obtainable for example from Synthomer under the tradename of SYNTHOMER MCT 5 or from Wacker under the tradename of VINNAPAS.

As component B the water-soluble hotmelt adhesive according to the invention contains 15 to 45% by weight, preferably 20 to 40% by weight and particularly preferably 25 to 35% by weight of at least one water-soluble or water-dispersible polyurethane.

Polyurethanes suitable as component B for the purposes of the present invention are normally prepared by reaction of at least one polyisocyanate, preferably a diisocyanate, and a polyol component which preferably consists predominantly of diols. The polyol component may contain only one polyol although a mixture of two or more different polyols may also be used as the polyol component. Polyalkylene oxides, for example polyethylene oxide, are particularly suitable as the polyol component or at least as part of the polyol component.

The term "ionic" means that the polyurethane contains ionic groups or at least groups which are ionisable in an acid/base reaction as solubilizers, for example carboxylate, sulphonate, phosphonate or ammonium groups.

The term "nonionic" accordingly means that the polyurethane does not contain any ionic groups as emulsifying groups, i.e., no carboxylate, sulphonate, phosphonate or ammonium groups. The water-solubility is attributable instead to the hydrophilic nonionic groups of the polyoxyethylene —[CH 2—CH2—O—]—. These structural units are derived in particular from the polyethylene oxide preferably used as polyol component. However, polyethylene oxide in the present context encompasses not only polyaddition products of ethylene oxide with water or ethylene glycol as starter molecule, but also polyaddition products of ethylene oxide with other dihydric alcohols, for example, butanediol, hexanediol or 4,4'-dihydroxydiphenylpropane. Mixtures of two or more different polyethylene oxides differing, for example, in their average molecular weight $M_w$ or $M_n$ or in both may also be used. Copolymers of ethylene oxide with higher alkylene oxides, for example with propylene oxide, may also be used as the polyol component providing they are sufficiently soluble in water, i.e., more than about 3 g remains dissolved in about 100 g of water at about 20° C. over a period of about 6 months.

Up to 10% by weight, preferably up to at most 5% by weight and more preferably up to at most 2% by weight of the polyethylene oxide in the polyol component may be replaced by other diols which contain a hydrophobic radical with a water-solubility of at most 2 g/100 g water. The hydrophobic radical is in particular an aliphatic or alicyclic structure containing 2 to 44 carbon atoms and more particularly 6 to 36 carbon atoms. The radicals in question may also contain aromatic structures. Diols containing at least one primary OH group, more particularly 1,2- or α,ω-diols, are preferred. However, diols with vicinal OH groups are also suitable.

The polyethylene oxide in the polyol component preferably has a molecular weight ($M_n$) of about 200 to about 20,000, more particularly of about 1,000 to about 15,000, for example of about 1,550, 3,000, 6,000 or 12,000.

In addition, up to 10% and preferably from 0.5 to 5% of the polyethylene glycol may be replaced by hydrophobic homopolymeric polyalkylene glycols, the alkylene group containing more than 2, preferably 3 or 4 carbon atoms. Their molecular weights are in particular in the range of 150 to 10,000 g/mole.

Specific examples of the hydrophobic diols containing pure CH radicals and ether groups are polypropylene glycol (PPG), polybutylene glycol, polytetrahydrofuran, polybutadienediol, hydroxyl-terminated ethylene/butylene copolymers (for example KRATON LIQUID Polymer L-2203), hydrogenated polybutadienediol and alkanediols containing 4 to 44 carbon atoms. Preferred hydrophobic diols are polypropylene glycol, polytetrahydrofuran with a molecular weight of 150 to 10,000, preferably 200 to 4,500 and more preferably 250 to 1,000, 1,10-decanediol, 1,12-dodecanediol, 1,12-octadecanediol, dimeric fatty acid diol, 1,2-octanediol, 1,2-dodecanediol, 1,2-hexadecanediol, 1,2-octadecanediol, 1,2tetradecanediol, 4,4-isopropylidene dicyclohexanol and isomer mixtures thereof, 4,8-bis (hydroxymethyl)tricyclo[5,2,1,0$^{2,6}$]decanes and isomer mixtures thereof, 1,4:3,6-dianhydro-D-mannitol, 1,4:3,6-dianhydro-D-sorbitol, 1,16-hexadecanediol, bisphenol A and propoxylation and/or ethoxylation products thereof, more particularly with up to 30 EO units, and finally monofatty acid esters of glycerol with fatty acids containing up to 22 carbon atoms, for example glycerol monoesters of behenic acid, oleic acid, stearic acid, myristic acid. Mixtures of two or more of the hydrophobic diols may of course also be used.

In addition, 0 to 5%, and more particularly 0.2 to 2%, of the polyethylene glycol may be replaced by alcohols of relatively high functionality, more particularly by triols, for example by glycerol, trimethylol propane, triethanolamine or ethoxylated or propoxylated variants thereof. Pentaerythritol may also be used. Ethoxylated or propoxylated variants of amines or amino alcohols, for example starting from ethylenediamine, diethylenetriamine, and higher homologues thereof, for example aminophenol, N-2-aminoethyl piperazine, are also possible.

In order to obtain polyurethanes of particularly high molecular weight, high-purity diols should be used. To this end, the content of alkali and alkaline earth metal ions should be less than 500 ppm, in particular less than 150 ppm and preferably less than 10 ppm. In addition, the water content should be below 0.5% by weight, in particular below 0.1% by weight and preferably below 0.05% by weight, as determined by the K. Fischer method.

Besides the diols of the polyol component, diisocyanates are key constituents of the polyurethane suitable as component B. Diisocyanates are compounds with the general structure O=C=N—X—N=C=O, where X is an aliphatic, alicyclic or aromatic radical, preferably an aliphatic or alicyclic radical containing 4 to 18 carbon atoms.

Examples of suitable isocyanates are 1,5-naphthylene diisocyanate, 4,4'diphenylmethane diisocyanate (MDI), hydrogenated MDI (H$_{12}$MDI), xylylene diisocyanate (XDI), tetramethyl xylylene diisocyanate (TMXDI), 4,4'-diphenyl dimethylmethane diisocyanate, di- and tetraalkylene diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid bis-isocyanatoethyl ester; also diisocyanates containing reactive halogen atoms, such as 1-chloromethylphenyl-2,4-diisocyanate, 1-bromomethylphenyl-2,6-diisocyanate or 3,3-bis-chloromethylether-4,4'-diphenyl diisocyanate. Sulphur-containing polyisocyanates are obtained, for example, by reaction of 2 moles of hexamethylene diisocyanate with 1 mole of thiodiglycol or dihydroxydihexyl sulphide. Other examples of diisocyanates are trimethyl hexamethylene diisocyanate, 1,4-diisocyanatobutane, 1,12-diisocyanatododecane and dimeric fatty acid diisocyanate.

Particularly suitable diisocyanates are tetramethylene, hexamethylene, undecane, dodecamethylene, 2,2,4-trimethylhexane, 1,3-cyclohexane, 1,4-cyclohexane, 1,3- and 1,4-tetramethyl xylene, isophorone, 4,4-dicyclohexanemethane and lysine ester diisocyanate.

Tetramethyl xylylene diisocyanate (TMXDI), more particularly the m-TMXDI obtainable from Cyanamid, is most particularly preferred.

In order further to increase the molecular weight, chain extension, for example, may be carried out in known manner by first preparing prepolymers with excess diisocyanate and then extending them with short-chain amino alcohols, diols or diamines or with water to increase the molecular weight.

To this end, prepolymers are initially prepared with excess diisocyanate and are then extended with short-chain diols or diamines or with water. Specific examples of chain-extending agents include: saturated and unsaturated glycols, such as ethylene glycol or condensates of ethylene glycol, 1,3-butanediol, 1,4-butanediol, 2-butane-1,4-diol, 2-butine-1,4diol, 1,2-propanediol, 1,3-propanediol, neopentyl glycol, hexanediol, bishydroxymethyl cyclohexane, dioxyethoxyhydroquinone, terephthalic acid-bisglycol ester, succinic acid di-2-hydroxyethylamide, succinic acid di-N-methyl-(2-hydroxyethyl)-amide, 1,4-di-(2-hydroxymethyl mercapto)-2,3,5,6-tetra-chlorobenzene, 2-methylene-1,3-propanediol, 2-methyl-1,3-propanediol, 3-pyrrolidino-1,2-propanediol, 2-methylene-2,4-pentanediol, 3-alkoxy-1,2propanediol, 2-ethylhexane-1,3-diol, 2,2-dimethyl-1,3-propanediol, 1,5pentanediol, 2,5-dimethyl-2,5-hexanediol, 3-phenoxy-1,2-propanediol, 3benzyloxy-1,2-propanediol, 2,3-dimethyl-2,3-butanediol, 3-(4-methoxyphenoxy)-1,2-propanediol and hydroxymethyl benzyl alcohol; aliphatic, cycloaliphatic and aromatic diamines, such as ethylenediamine, hexamethylenediamine, 1,4-cyclohexylenediamine, piperazine, N-methyl propylenediamine, diaminodiphenyl sulphone, diaminodiphenyl ether, diaminodiphenyl dimethyl methane, 2,4-diamino-6-phenyl triazine, isophoronediamine, dimeric fatty acid diamine, diaminodiphenyl methane or the isomers of phenylenediamine; carbohydrazides or hydrazides of dicarboxylic acids; amino alcohols, such as ethanolamine, propanolamine, butanolamine, N-methyl ethanolamine, N-methyl isopropanolamine, diethanolamine, triethanolamine and higher di- or tri(alkanolamines); aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and di-aminobenzoic acids and the isomeric mono- and di-aminonaphthoic acids.

However, the polyurethane is preferably produced by a single-stage process. In this process, all the starting materials are initially mixed in the presence of an organic solvent at a water content of less than 0.5% by weight. The mixture is heated for about 1 to 30 hours to a temperature of 60 to 200° C., more particularly to a temperature of 80 to 180° C. and preferably to a temperature of 100 to 150° C.

The reaction time can be shortened by the presence of catalysts.

Particularly suitable catalysts are tertiary amines, for example triethylamine, 1,4diazabicyclo[2,2,2]octane (=DABCO), dimethyl benzylamine, bisdimethylaminoethyl ether and bis-methylaminomethyl phenol. 1-Methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4dimethylaminopyridine, 4-pyrrolidinopyridine, 4-morpholinopyridine, 4-methylpyridine are particularly suitable.

Organotin compounds may also be used as the catalysts. Organotin compounds are understood to be compounds which contain both tin and an organic radical, more particularly compounds which contain one or more Sn—C compounds. Organotin compounds in the broader sense include, for example, salts, such as tin octoate and tin stearate. Tin compounds in the narrower sense include above all compounds of tetravalent tin with the general formula $R_{n+1}SnX_{3-n}$, where n is a number from 0 to 2, R is an alkyl group or an aryl group or both and, finally, X is an oxygen, sulphur or nitrogen compound or a mixture of two or more thereof. R preferably contains at least 4 carbon atoms and, in particular, at least 8 carbon atoms. The upper limit is generally at 12 carbon atoms. X is preferably an oxygen compound, i.e. an organotin oxide, hydroxide, carboxylate or ester of an inorganic acid. However, X may also be a sulphur compound, i.e. an organotin sulphide, thiolate or thioacid ester. Among the Sn—S compounds, thioglycolic acid esters above all are of interest, for example compounds containing the following radicals:

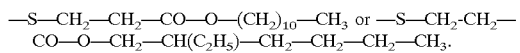

Compounds such as these satisfy another selection criterion: in a preferred embodiment of the invention, the molecular weight of the organotin compound should be above 250 and, more particularly, above 600.

Another preferred class of compounds are the dialkyl tin(IV) carboxylates (X=OCO—R'). The carboxylic acids contain 2, preferably at least 10 and more preferably 14 to 32 carbon atoms. Dicarboxylic acids may also be used. Suitable acids are, for example, adipic acid, maleic acid, fumaric acid, terephthalic acid, phenyl acetic acid, benzoic acid, acetic acid, propionic acid and, in particular, caprylic, capric, lauric, myristic, palmitic and stearic acid. Specific examples are dibutyl tin diacetate and dilaurate and dioctyl tin diacetate and dilaurate.

Tin oxides and sulphides and thiolates may also be used in accordance with the present invention. Specific compounds are bis-(tributyl tin)oxide, dibutyl tin didodecyl thiolate, dioctyl tin dioctyl thiolate, dibutyl tin bis(thioglycolic acid-2-ethylhexyl ester), octyl tin-bis(thioglycolic acid-2-ethyl hexyl ester), dioctyl tin bis(thioethylene glycol-2-ethylhexoate), dibutyl tin bis(thioethylene glycol laurate), dibutyl tin sulphide, dioctyl tin sulphide, bis(tributyl tin)sulphide, dibutyl tin bis(thioglycolic acid-2-ethylhexyl ester), dioctyl tin bis(thioethylene glycol-2-ethylhexoate), trioctyl tin thioethylene glycol-2-ethylhexoate and dioctyl tin bis(thiolatoacetic acid-2-ethylhexyl ester), bis(S,S-methoxycarbonylethyl) tin bis(thiolatoacetic acid-2-ethylhexyl ester), bis(S,S-acetylethyl) tin bis(thiolatoacetic acid-2-ethylhexyl ester), tin(II) octyl thiolate and tin(II) thioethylene glycol-2-ethylhexoate.

Other examples are dibutyl tin diethylate, dihexyl tin dihexylate, dibutyl tin diacetyl acetonate, dibutyl tin diethyl acetyl acetate, bis(butyl dichlorotin)oxide, bis(dibutyl chlorotin)sulphide, tin(II) phenolate, tin(II) acetyl acetonate and other α-dicarbonyl compounds, such as acetyl acetone, dibenzoyl methane, benzoyl acetone, ethyl acetoacetate, n-propyl acetoacetate, α, α'-diphenyl acetoacetate and dehydroacetic acid.

The catalyst is preferably added to the polyol. The quantity in which it is used is determined by its activity and by the reaction conditions and is preferably in the range from 0.001 to 0.5% by weight, based on the polyol.

However, the reaction is preferably carried out in the absence of a catalyst. The solvent, too, is also preferably omitted. "Solvents" in the present context are understood to be inert organic liquids with a boiling point below 200° C. at normal pressure (1 bar).

The reaction is preferably carried out in such a way that the ratio of OH groups in the polyol component to NCO groups in the polyisocyanate is about 1.0 to about 2.0, more particularly about 1.05 to 1.8, for example about 1.1 to 1.7 or about 1.3 to 1.6.

Another method of introducing ion-forming structural elements is to react OH-terminated polyurethane oligomers with dicarboxylic anhydrides. These may contain in all 2 to 44 and preferably 2 to 12 carbon atoms between the bis-acyl groups, such as an alkylene, alkenylene or arylene group. Specific examples are succinic anhydride, glutaric anhydride, 1,2,3,6-tetrahydrophthalic anhydride and isomers thereof, phthalic anhydride, trimellitic anhydride, 7-oxabicyclo[2,2,1]hept-5-ene-2,3-dicarboxylic anhydride, 5-norbornene-2,3-dicarboxylic anhydride and isomers thereof, diglycolic anhydride, maleic anhydride, dimethyl maleic anhydride, citraconic anhydride, itaconic anhydride, alkenyl succinic anhydrides, preferably those of which the alkenyl groups contain more than 2 carbon atoms, more preferably more than 5 and, most preferably, more than 7 carbon atoms. Specific examples are n-octenyl succinic anhydride, n-dodecenyl succinic anhydride, tetrapropenyl succinic anhydride, n-hexadecenyl succinic anhydride and n-octadecenyl succinic anhydride. The alkenyl chain may be linear or branched. In addition, mixtures of alkenyl groups with different numbers of carbon atoms may also occur.

Mixtures of several anhydrides are also possible, although cyclic anhydrides are preferred.

A molar excess of isocyanates may also be used, in which case NCO-terminated oligomers are formed.

In general, NCO groups are not wanted in the end product. However, NCO groups may be used in order, for example, to introduce hydrophobic or ionic structural elements.

Hydrophobic structural elements may also be obtained by reaction of NCOterminated oligomers with monools or monofunctional amines containing $\geq 2$ carbon atoms, more particularly $\geq 6 \geq 10$ or $\geq 16$ carbon atoms. Specific examples are polyethylene/butylene containing one OH group, for example with an OH equivalent weight of 3,600 (KRATON L 1203), 1-hexanol, 1-heptanol, 1-octanol, 1-nonanol, 1-decanol, 1-undecanol, 10-undecen-1-ol, 1-dodecanol, 1-tridecanol, 1-tetradecanol, 1-pentadecanol, 1-hexadecanol, 1-heptadecanol, 1-octadecanol, 9-cis-octadecen-1-ol, 9-trans-octadecen-1-ol, 9-cis-octadecen-1, 12-diol, all-cis-9,12,octadecadien-1-ol, all-cis-9,12,15-octadecatrien-1-ol, 1-nonadecanol, 1-eicosanol, 9-cis-eicosen-1-ol, 5,8,11,14-eicosatetraen-1-ol, 1-heneicosanol, 1-docosanol, 13-cis-docosen-1-ol, 13-trans-docosen-1-ol. The corresponding fatty amines may also be used as hydrophobizing structural elements.

Finally, another method of introducing ion-forming structures is to react NCO-terminated oligomers with hydroxycarboxyiic acids or aminocarboxylic acids containing alkylene, alkenylene or arylene groups, as in the case of the dicarboxylic anhydrides. Examples include glycolic acid, lactic acid, caproic acid and mandelic acid and also aminocaproic acid, aminododecanoic acid, glycine, alanine and phenyl alanine.

In one preferred embodiment of the invention, a non-ionic polyurethane with a molecular weight ($M_n$) of at least about 2,000, more particularly a nonionic polyurethane obtainable by reacting at least one polyisocyanate with at least one polyalkylene glycol with a molecular weight of at least 1,000, is used as the component B.

The nonionic polyurethane used as component B has a viscosity of 500 to 80,000 mPas, preferably 1,000 to 60,000 mPas and more preferably 2,000 to 40,000 mPas at 150 degrees C. (Brookfield, Spindel 27, ASTM-D 3236-88).

The use of the nonionic polyurethane leads to a better product stability/homogeneity during production and application of the adhesive. It improves the rheological properties of the adhesive composition. In particular at high machine speeds (about 600 m/min) the adhesive according to the invention forms uniform fibers (no spots) during application with spray systems.

Component A is preferably in the form of a salt.

The function of the inorganic or organic base as component C in the water-soluble hotmelt adhesive according to the invention is to assist the solubilizing of component A when mixing the adhesive composition with water. For example, sodium hydroxide or potassium hydroxide can be used as inorganic bases.

Aliphatic amino alcohols, for example, belong to the group of organic bases. In the context of the present invention the use of alkanolamines, preferably trialkanolamines, with 2 to 6 carbon atoms in the alkanol radical is preferred. The length of the carbon chain in the alkanol radicals can be the same or different.

In particular, the use of triethanolamine leads to a clear hotmelt solution in water.

The amount of component C in the water-soluble hotmelt adhesive is 10 to 45% by weight, preferably 12 to 35% by weight and more preferably 15 to 25% by weight.

The hotmelt adhesive may contain other additives, for example base polymers, plasticizers, rheological additives, antioxidants, UV stabilizers, dyes, tackifier resins and water and/or organic solvents to a maximum of 3% by weight, providing these additives do not impair the water-solubility of the hotmelt adhesive composition.

The tackifiers used are, for example, hydrocarbon resins, more particularly C5 or C9 resins or C5-resin-modified C9 resins. In addition, resins based on pure hydrocarbon monomers, for example resins obtainable from the polymerisation of mixtures of styrene, $\alpha$-methyl styrene and vinyl toluene, are suitable for use as tackifiers. The hydrocarbon resins mentioned may be partly or completely hydrogenated.

Also suitable for use as tackifiers are natural resins, such as balsam resin which is obtained, for example, from trees and tall oil resin which accumulates in the production of paper. The natural resins may be used in the above-mentioned form as tackifiers although they may also be used after esterification with corresponding polyhydric alcohols as pentaerythritol esters, glycerol esters, diethylene glycol esters, triethylene glycol esters or methyl esters.

Polyterpene resins are also suitable as tackifiers. Terpenes accumulate in the separation of resin acids from their natural solvents and may be polymerised to polyterpene resins. The terpene-phenol resins obtainable by phenol modification from polyterpene resins are also suitable for use as tackifiers.

Antioxidants known to a person skilled in the art are used as antioxidants. These are antioxidants based on thioethers, hindered and/or multifunctional phenols, hydroxylamine or organic phosphorus compounds, for example organic disphosphites. The antioxidants are used singly or in a mixture. Water-soluble antioxidants are preferably used. Typical commercially available antioxidants are supplied by Ciba under the trade names IRGANOX 1010 and IRGANOX 1076.

The amount of antioxidants in the overall composition is 0.05 to 2.5% by weight, preferably 0.1 to 2% by weight and more preferably 0.25 to 1.5% by weight.

The additives may be present in the hotmelt adhesive either individually or in the form of a mixture of two or more of the substances mentioned. The additives should be used in a quantity not exceeding about 20% by weight (based on the hotmelt adhesive as a whole). Suitable quantities are, for example, quantities of about 0.1 to about 15% by weight or of about 1 to about 10% by weight. In a preferred embodiment of the invention, the additives are used in quantities of, for example, about 2, 3,4, 5, 7 or 9% by weight.

The invention further relates to a process for producing a water-soluble hotmelt adhesive wherein at a temperature of 70 to 150° C., preferably 90 to 120° C.: 40 to 70% by weight of at least one homo or copolymer with free carboxylic acid groups based on ethylenically unsaturated monomers (component A), more preferably a vinly acetate/crotonic acid copolymer with an acid value of 10 to 200 mg KOH/g (measured according ASTM D 974) and 15 to 40% by weight of at least one water-soluble or water-dispersible polyurethane (component B), in particular a nonionic polyurethane with a viscosity of 500 to 80,000 mPas at 150° C. (measured according Brookfield Spindel 27 ASTM D 3236-88) and if necessary further additives, e.g. antioxidants, are mixed to achieve a homogenous melt and then, at a maximum temperature of 100° C., preferably in a range of 80 to 100° C., more preferably in a range of 85 to 95° C., 10 to 45% by weight of at least one inorganic or organic base, preferably trialkanolamine, more preferably triethanolamine, are added and optionally further additives, the total amount of additives being 0 to 20% by weight, and the mixture is stirred until a homogenous blend forms.

The water-soluble hotmelt adhesives according to the invention have viscosities that enable them to be applied by standard application methods. Accordingly, the hotmelt adhesives advantageously have a viscosity (Brookfield, Thermocell, Spindel 27, ASTM D 3236-88) in the range from 1000 mPas to 20,000 mPas, preferably from 1500 mPas to 15,000 mPas and more preferably from 2000 to 8000 mPas at 120° C.

The water-soluble hotmelt adhesive according to the invention is used as an adhesive for bonding paper or textile fabrics in the textiles, packaging and paper industry.

The water-soluble hotmelt adhesive according to the invention is suitable for producing at least two-ply paper laminates, especially for producing at least two-ply hygiene papers and/or textile laminates.

The invention therefore also relates to at least two-ply paper-laminates, especially hygiene papers and textile laminates, which contain the hotmelt adhesive according to the invention and to a process for producing at least two-ply paper laminates and textile laminates by using the hotmelt adhesive according to the invention.

Textile laminates are especially used in the clothing industry. Textile laminates are taken to mean at least two-ply laminates made of textile fabrics, for example knitted or woven articles. The textile fabrics consist of synthetic and/or artificial fibers, for example polyester, polyamide, polypropylene, cotton, viscose and mixtures thereof.

The textile fabrics can be laminated using plastic films. These are especially plastic films which are waterproof and windproof but water vapor-permeable. Textile laminates of this kind are disclosed in EP 0238014. The hotmelt adhesive according to the invention is applied to at least one surface of a first textile fabric, which can already be a component of a textile laminate, and laminated against the surface of a second textile fabric. After laminating, the textile laminate is cut to the desired shape and sewn at the desired points. As the hotmelt adhesive according to the invention is preferably used for temporary fixing for the duration of the sewing operation it is washed out of the sewn textile laminate. In this manner the otherwise conventionally used mechanical aids for fixing of the textile laminates to be sewn, such as inter alia needling and clipping, are superfluous and productivity is increased.

"Hygiene papers" in the context of the present invention are papers used primarily in the home, in communal facilities and for personal hygiene, for example kitchen roll, paper towels, paper handkerchiefs, paper napkins, toilet paper, diapers and the like. The water-soluble hotmelt adhesive according to the invention is particularly suitable for producing paper laminates of tissue paper.

"Tissue paper" is a particularly thin, soft, largely wood-free material, optionally with fine (dry) creping. The material is highly absorbent and generally has a weight per unit area as a single layer of $\geq 25$ g/m$^2$ (before creping). Toilet papers, paper handkerchiefs and cosmetic wipes are generally made from the tissue laminates obtainable by the process according to the invention.

The production of at least two-ply paper laminates or textile laminates generally contains at least one process step in which the hotmelt adhesive according to the invention is applied to a first layer of paper or to at least one surface of a first textile fabric, and a second layer of paper or a second textile fabric is laminated onto the adhesive side of the first paper layer or the at least one surface of a first textile fabric after a certain time and spatial interval. To ensure adequate adhesion is developed between the first and second layers of substrate, the hotmelt adhesive must still be sufficiently tacky at the time the second substrate layer is laminated on, i.e. it should not yet be physically cured. The period after application of the hotmelt adhesive in which the adhesive has sufficient tackiness for a second layer of substrate to be laminated on is referred to hereinafter as the "open time".

By "sufficiently tacky" is meant a tackiness which produces a bond between the paper layers with a peel strength of more than 0 N/cm.

The machine speed in the laminating process for producing textile laminates is a maximum of 100 m/min.

At typical machine speeds for the production of at least two-ply paper laminates of, for example, up to 600 m/min, it is generally sufficient if the hotmelt adhesive has an open time of about 0.1 to about 1 second, for example about 0.2 to about 0.5 second. If the hotmelt adhesive is only to be used when the machine has reached its full speed, an open time of the order mentioned above is generally sufficient. However, if the hotmelt adhesive is intended to lead to the bonding of at least two layers of paper during the startup phase of the machine, for example, the open time should be longer than indicated above. In that case, open times of for example about 1 to about 10 seconds, for example about 2 to about 8 seconds or about 4 to about 6 seconds, are advantageous.

The water-soluble hotmelt adhesives according to the invention have the advantage of simplifying the recycling of already bonded paper layers into the stock circuit for producing new paper layers. To this end, water is generally added to the already bonded layers of paper, dissolving the hotmelt adhesive and at the same time producing a fiber slurry suitable for further processing. This water generally has a temperature above the ambient temperature, for example in the range from about 25 to about 80° C. With water solubility of at least 3 g of the hotmelt adhesive in 600 g water at a pH of 5 and 8 it is ensured that the adhesive remains in solution in the remanufacturing process, so production failure caused by "sticky spots" is avoided.

In a preferred embodiment of the process for producing at least two-ply paper laminates or textile laminates hotmelt adhesives according to the invention are used which are miscible with water in substantially any quantity, i.e., there is no miscibility gap at concentrations of at least about 10% by weight or higher, for example about 20% by weight or about 50% by weight and above.

The water-soluble hotmelt adhesives according to the invention are generally processed by applying the hotmelt adhesive to the paper layers or at least one surface of a textile fabric in molten form by conventional methods. Suitable methods of application are, for example, application by rollers, slot dies and spray nozzles and for textile laminates, in particular, screening.

If the hotmelt adhesive is applied by roller, only very high weights per unit area of adhesive can generally be achieved. Accordingly, roller application is normally used for firmly bonding the individual paper layers. Hotmelt adhesives suitable for application by roller are, for example, those with a melt viscosity at about 120 to about 150° C. (Brookfield Thermocell, Spindel 27, ASTM D 3236-88) in the range from about 1,000 to about 6,000 mPas and more particularly in the range from about 2,000 to about 3,000 mPas. Moisture-tackifiable papers, for example, can be produced by roller application.

"Moisture-tackifiable" papers are understood to be papers that can be converted by moistening into self-adhesive systems. For this purpose, the paper or a first paper layer has, on one side at least, a layer which can be tackified by moistening with water and applied, for example, to a second layer of paper. After evaporation of the water, the paper layers adhere to one another. Examples of such materials are stamps, envelopes, labels and the like.

If the hotmelt adhesive is applied by means of a slot die, a hotmelt adhesive with a melt viscosity at about 120 to about 150° C. (Brookfield Thermocell, Spindel 27, ASTM D 3236-88) in the range from about 400 to about 20,000 and more particularly in the range from about 600 to about 5,000 mPas is generally used for this purpose.

Application of the hotmelt adhesive by a spray nozzle is preferred for bonding tissues, the adhesive not being applied over the whole surface. The bonding of tissues can be carried out both by atomizing and by non-atomizing spray nozzles (also called "spin spraying").

Atomizing spray nozzles generally require a hotmelt adhesive which has a melt viscosity at about 120 to about 150° C. (Brookfield Thermocell, Spindel 27, ASTM D 3236-88) in the range from about 400 to about 10,000 and more particularly in the range from about 600 to about 5,000 mPas. Non-atomizing spray nozzles require hotmelt adhesives with a slightly higher viscosity in order to guarantee the necessary filament cohesion. For example, hotmelt adhesives with a melt viscosity at a temperature of about 120 to about 150° C. (Brookfield Thermocell, Spindel 27) in the range from about 3,000 to about 10,000 mPas are suitable.

The invention is illustrated by the following examples.

EXAMPLES
Production of the Hotmelt Adhesives

Example 1

34% by weight of an nonionic polyurethane (TECHNOMELT 337VP, Henkel KGaA) with a water-solubility of 3 g/600 g in water at 40° C., and a viscosity of 4000 mPas at 150° C. (Brookfield, Thermocell, Spindel 27, ASTM D 3236-88) and 50.5% by weight of SYNTHOMER MCT 5 (vinyl-acetate/crotonic acid copolymer, Synthomer, acid value 35–45 mg KOH/g) were homogenized at a temperature of 120° C.

After homogenization the blend was cooled to 90° C. and 15% by weight triethanolamine and 0.5% by weight of an antioxidant (IRGANOX 1010, Ciba) were added.

The blend was stirred until a homogenous melt formed.

Example 2

28% by weight of an nonionic polyurethane (TECHNOMELT 337VP, Henkel KGaA) with a water-solubility of 3 g/600 g in water at 40° C. and a viscosity of 4000 mPas at 150° C. (Brookfield, Thermocell, Spindel 27, ASTM D 3236-88) and 54% by weight of SYNTHOMER MCT 5 (vinyl acetate/crotonic acid copolymer, Synthomer, acid value 35–45 mg KOH/g) were homogenized at a temperature of 120° C.

After homogenization the blend was cooled to 90° C. and 17% by weight triethanolamine and 0.5% by weight of an antioxidant (IRGANOX 1010, Ciba) was added.

The blend was stirred until a homogenous melt formed.

Example 3

16% by weight of an nonionic polyurethane (TECHNOMELT 337VP, Henkel KGaA) with a water-solubility of 3 g/600 g in water at 40° C. and a viscosity of 4000 mPas at 150° C. (Brookfield, Thermocell, Spindel 27, ASTM D 3236-88) and 63% by weight of SYNTHOMER MCT 5 (vinyl-acetate/crotonic acid copolymer, Synthomer, acid value 35–45 mg KOH/g) were homogenized at a temperature of 120° C.

After homogenization the blend was cooled to 90° C. and 20.5% by weight triethanolamine and 0.5% by weight of an antioxidant (IRGANOX 1010, Ciba) was added.

The blend was stirred until a homogenous melt formed.
Results and measuring methods:

The properties of the examples 1 to 3 according to the invention and the comparison examples 4 and 5 (examples 3 and 5 from U.S. Pat. No. 4,129,539) are reproduced in Table 1. The viscosity was determined in accordance with Brookfield (Thermocell, Spindel 27, ASTM D 3236-88).

The parameter "color" was visually determined and is based a) on the solid product and b) on the melt.

Compatibility is taken to mean the homogeneity of the blend in the melt and as a solid.

In the comparison examples separation was observed during the cooling process of the adhesive melt of the type such that drop formation occurred within the melt and on the surface of the melt. The heat stability was determined using the Unichem method No. 665.

200 g of the melt adhesive were weighed into an aluminum container and stored in an oil bath at 120° C. After the adhesive had formed a homogeneous melt a sample of 1.5 g was removed and poured into a round mold 1.3 cm in diameter. The color of the cooled melt adhesive was defined as the "standard color" at time t=0. The color was visually checked hourly over a period of 16 hours, wherein a sample was removed and assessed after cooling in each case analogously to the above process for determining the "standard color". If the color changes only insignificantly with respect to the standard color to a slightly yellow shade, the heat stability is classified as good. A change in color to a strong yellow color is classified as acceptable.
Water Solubility (Following the European Standard EN 1720)

Two 800 ml beakers were each filled with 600 g water. The water in the first beaker (BG1) was adjusted with a solution of phosphoric acid (1 part phosphoric acid to 100 parts water) to pH 5 (±0.1). The water in the second beaker (BG2) was adjusted with aqueous sodium hydroxide solution (1 part NaOH to 100 parts water) to pH 8 (+0.1).

The two beakers were brought to a temperature of 40° C. Two samples of 3 g each of the adhesive were preprepared in that a dried adhesive film of about 200 g/m² was cut into 1 cm² pieces. 3 g each of the cut adhesive film samples were poured while stirring into the beakers BG1 and BG2 and stirred for 90 min at 40° C.

The contents of BG1 and BG2 were then immediately[*] completely filtered in each case through a filter with a pore size of 100 micrometers, wherein the weight of the filter was determined before filtration. The filters were dried for two hours at 60° C. in a drying cabinet until constant in weight and then weighed. A quantity of 0 to 0.5% by weight filtration residue, based on the quantity of adhesive used, indicated that the adhesive could disperse well and was suitable for the recycling process.

[*]Note: Immediately before the filtration process there was a visual check as to whether the dispersal of the adhesive pieces led to an opaque/translucent or clear solution. The visual check took place in comparison to water as the standard. The standard is BG1 and BG2 without adhesive film pieces. The adhesives according to the invention visually indicated no difference to the standard, i.e., are clearly soluble.

TABLE 1

| Parameter | Example 1 | Example 2 | Example 3 | Comparison example 4 | Comparison example 5 |
|---|---|---|---|---|---|
| Viscosity (120° C.) | 7000–8000 mPas | 5500–6500 mPas | 8000–9000 mPas | 2500–3000 mPas | 5000–6000 mPas |
| Water solubility (3 g adhesive in 600 g water, pH 5 and pH 8 at 40° C.) | Clear and stable solution | Clear and stable solution | Clear and stable solution | Dispersible, cloudy and unstable | Dispersible, cloudy and unstable |
| Color | | | | | |
| a) Solid | a) pale yellow | a) pale yellow | a) pale yellow | a) whitish | a) whitish |
| b) Melt | b) translucent | b) translucent | b) translucent | b) opaque | b) opaque |
| Compatibility | Very good | Very good | Very good | Slightly incompatible | Slightly incompatible |
| Dried adhesive film | Very flexible | Very flexible | Very flexible | Rigid | Rigid |
| Heat stability | Good | Good | Good | Acceptable | Acceptable |
| Smell | Slight | Slight | Slight | Moderate | Strong |

While embodiments of the invention have been illustrated and described, it is not is not intended that these embodiments illustrate and describe all possible forms of the invention. Rather, the words used in the specification are words of description rather than limitation, and it is understood that various changes may be made without departing from the spirit and scope of the invention.

What is claimed is:

1. A water-soluble hotmelt adhesive, comprising as components:
    (A) 40 to 70% by weight of at least one homopolymer or copolymer with free carboxylic acid groups based on one or more ethylenically unsaturated monomers;
    (B) 15 to 45% by weight of at least one water-soluble or water-dispersible polyurethane;
    (C) 10 to 45% by weight of at least one inorganic or organic base; and
    (D) 0 to 20% by weight of one or more further additives; wherein the sum of said components (A)–(D) is 100% by weight.

2. A water-soluble hotmelt adhesive according to claim 1, wherein component (A) comprises a vinyl acetate/crotonic acid copolymer with an acid value from 10 to 200 mg KOH/g as measured in accordance with ASTM D 974.

3. A water-soluble hotmelt adhesive according to claim 1, wherein component (B) comprises a nonionic polyurethane with a viscosity of 500 to 80,000 mPas at 150° C. when measured in accordance with ASTM D 3336-88 using a Brookfield Theromcell device having a No. 27 spindle.

4. A water-soluble hotmelt adhesive according to claim 1, wherein component (C) comprises an alkanolamine containing one or more alkanol radicals and wherein the carbon chains in the alkanol radicals are the same or different in length and each contain 2 to 6 carbon atoms.

5. A water-soluble hotmelt adhesive according to claim 1 having a viscosity from 1000 to 20,000 mPas at 120° C. when measured in accordance with ASTM D 3336-88 using a Brookfield Thermocell device having a No. 27 spindle.

6. A water-soluble hotmelt adhesive according to claim 1, wherein component (A) comprises a copolymer of vinyl acetate and an ethylenically unsaturated aliphatic comonomer containing at least one carboxyl group per molecule.

7. A water-soluble hotmelt adhesive according to claim 1, wherein component (A) comprises a copolymer having an acid value of from 20 to 150 mg KOH/g when measured in accordance with ASTM D974.

8. A water-soluble hotmelt adhesive according to claim 1, wherein component (A) comprises from 50 to 60% by weight of the water-soluble hotmelt adhesive.

9. A water-soluble hotmelt adhesive according to claim 1, wherein component (A) comprises a vinyl acetate/crotonic acid copolymer having a softening point in the range of from 80 to 130 degrees C.

10. A water-soluble hotmelt adhesive according to claim 1, wherein component (A) comprises a vinyl acetate/crotonic acid copolymer having a molecular weight ($M_n$) in the range of from 10,000 to 60,000.

11. A water-soluble hotmelt adhesive according to claim 1, wherein component (B) comprises from 25 to 35% by weight of the water-soluble hotmelt adhesive.

12. A water-soluble hotmelt adhesive according to claim 1, wherein component (B) comprises at least one water-soluble or water-dispersible polyurethane prepared by a method comprising reacting at least one diisocyanate and at least one polyethylene oxide polyol.

13. A water-soluble hotmelt adhesive according to claim 12, wherein at least one diisocyanate is tetramethyl xylylene diisocyanate.

14. A water-soluble hotmelt adhesive according to claim 1, wherein said at least one water-soluble or water-dispersible polyurethane is non-ionic.

15. A water-soluble hotmelt adhesive according to claim 1, wherein said at least one water-soluble or water-dispersible polyurethane (B) contains ionic groups.

16. A water-soluble hotmelt adhesive according to claim 1, wherein component (A) is in the form of a salt.

17. A water-soluble hotmelt adhesive according to claim 1, wherein component (C) comprises triethanolamine.

18. A water-soluble hotmelt adhesive according to claim 1, wherein component (A) comprises a vinyl acetate/crotonic acid copolymer, component (B) comprises a non-ionic water-soluble or water-dispersible polyurethane, and component (C) comprises triethanolamine.

19. A process for producing a water-soluble hotmelt adhesive according to claim 1, comprising:
    a). mixing, at a temperature from 70° C. to 150° C., component (A), component (B) to form a homogeneous melt;
    b). combining, at a maximum temperature of 80 to 100° C., component (C) with the homogeneous melt,
    c). optionally adding component (D) in either or both of steps a) and b) with the total amount of (D) being 0 to 20% by weight of the adhesive and the sum of said components (A)–(D) being 100% by weight of the adhesive; and
    d). stirring the mixture until a homogeneous blend forms.

20. A process for bonding a first substrate comprised of paper or textile fabric to a second substrate comprised of paper or textile fabric, said method comprising using as adhesive a water-soluble hotmelt adhesive according to claim 1.

21. A process according to claim 20, wherein said method produces an at least two-ply hygiene paper.

22. A hygiene paper comprised of at least two plies of tissue paper and a water-soluble hotmelt adhesive according to claim 1.

23. A textile laminate comprising at least two layers of textile fabric and a water-soluble hotmelt adhesive according to claim 1.

24. A moisture-tackifiable paper comprising a first paper layer and a water-soluble hotmelt adhesive according to claim 1.

25. A process for producing a paper laminate, comprising applying a water-soluble hotmelt adhesive according to claim 1 to a first layer of paper and laminating at least one second layer of paper onto the adhesive side of the first layer of paper.

26. A process for producing a moisture-tackifiable paper, comprising applying a water-soluble hotmelt adhesive according to claim 1 to at least one side of the paper.

27. A process for producing a textile laminate, comprising applying a water-soluble hotmelt adhesive according to claim 1 to at least one surface of a first textile fabric and applying at least one second textile fabric to the adhesive side of the first textile fabric.

28. The process of claim 27, comprising the additional steps of sewing together the textile laminate and removing the water-soluble hotmelt adhesive from the textile laminate by washing with water.

* * * * *